(12) United States Patent
Rose et al.

(10) Patent No.: US 11,558,240 B2
(45) Date of Patent: Jan. 17, 2023

(54) NETWORK ELEMENT WITH DUAL INDEPENDENT SUB NETWORK ELEMENTS WITH SEAMLESS FAILOVER

(71) Applicant: Arista Networks, Inc., Santa Clara, CA (US)

(72) Inventors: Alexander S. Rose, Monte Sereno, CA (US); Anshul Sadana, Santa Clara, CA (US); Hugh W. Holbrook, Palo Alto, CA (US); Min H. Teng, Los Altos, CA (US); Fai Li, San Jose, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 17/190,950

(22) Filed: Mar. 3, 2021

(65) Prior Publication Data

US 2021/0281470 A1    Sep. 9, 2021

Related U.S. Application Data

(60) Provisional application No. 62/984,572, filed on Mar. 3, 2020.

(51) Int. Cl.
*H04L 41/0654*   (2022.01)
*H04L 43/0817*   (2022.01)
*H04L 45/24*   (2022.01)

(52) U.S. Cl.
CPC ...... *H04L 41/0654* (2013.01); *H04L 43/0817* (2013.01); *H04L 45/24* (2013.01)

(58) Field of Classification Search
CPC . H04L 41/0654; H04L 43/0817; H04L 45/24; H04L 49/557; H04L 45/026
USPC ......................................................... 370/220
See application file for complete search history.

(56) References Cited

U.S. PATENT DOCUMENTS

| | | | | |
|---|---|---|---|---|
| 6,148,410 | A * | 11/2000 | Baskey ............... | H04L 49/557 714/4.11 |
| 10,505,847 | B1 * | 12/2019 | Singarayan ......... | H04L 49/3009 |
| 2006/0155828 | A1 * | 7/2006 | Ikeda .................. | H04L 41/08 709/223 |
| 2010/0034081 | A1 * | 2/2010 | Yoshimura .......... | H04L 12/66 370/352 |
| 2014/0143591 | A1 * | 5/2014 | Chiang ............... | G06F 11/2002 714/4.11 |
| 2017/0230230 | A1 * | 8/2017 | Theogaraj ........... | H04L 45/48 |

* cited by examiner

*Primary Examiner* — Meng Vang
(74) *Attorney, Agent, or Firm* — Sprinkle IP Law Group

(57) ABSTRACT

A system that provides communication services may include two switches for redundancy. The switches may indicate that they are independent devices to upstream devices and indicate that they are the same device to a predetermined device set. If one of the switches enters an undesired state, then the switch in a standby state may modify the upstream devices to preferentially forward packets directed toward the predetermined device set to the standby switch rather than an active switch, and after transitioning the active switch to the standby state, transition the standby switch to the active state.

20 Claims, 13 Drawing Sheets

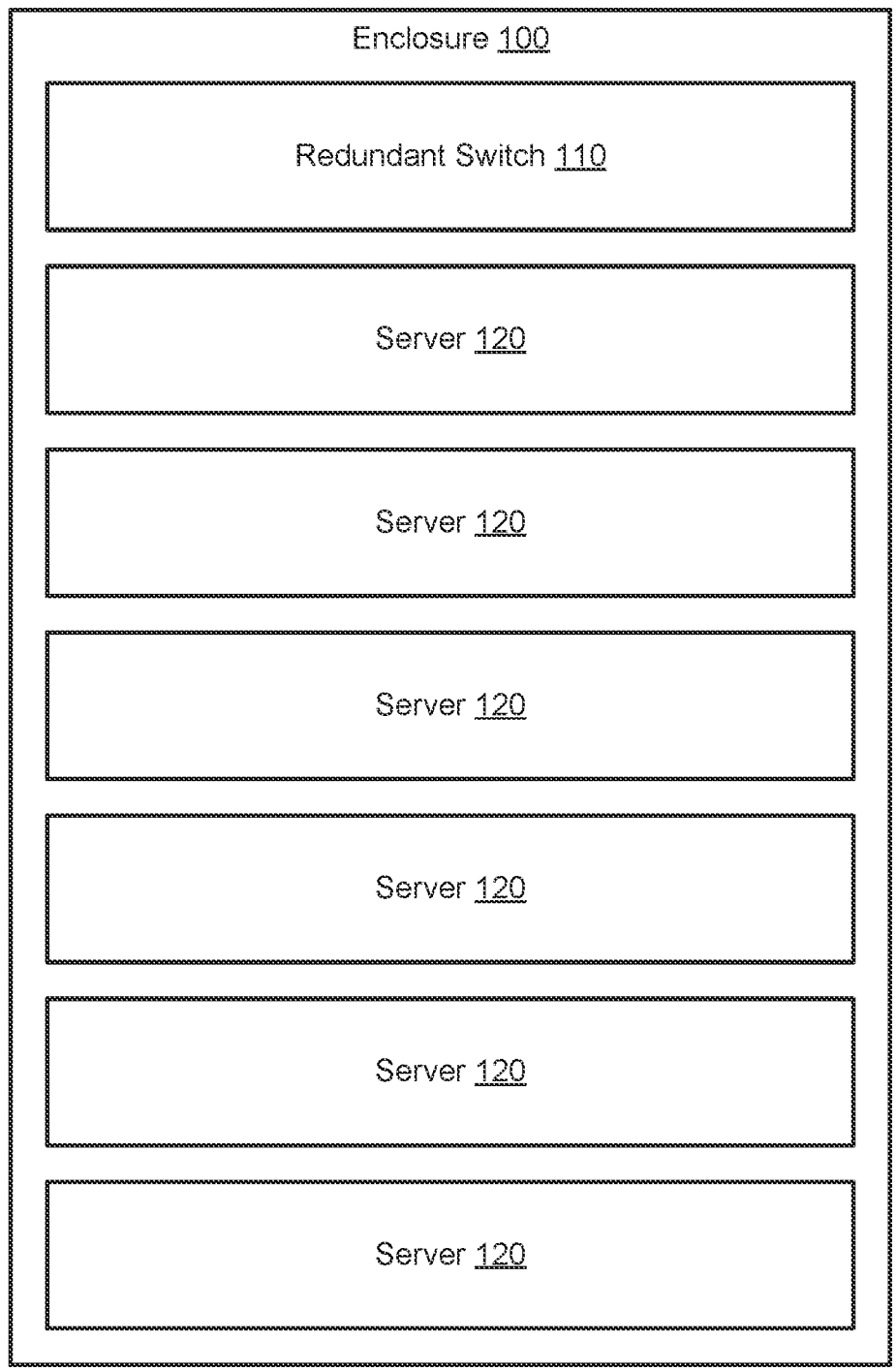
FIG. 1.1

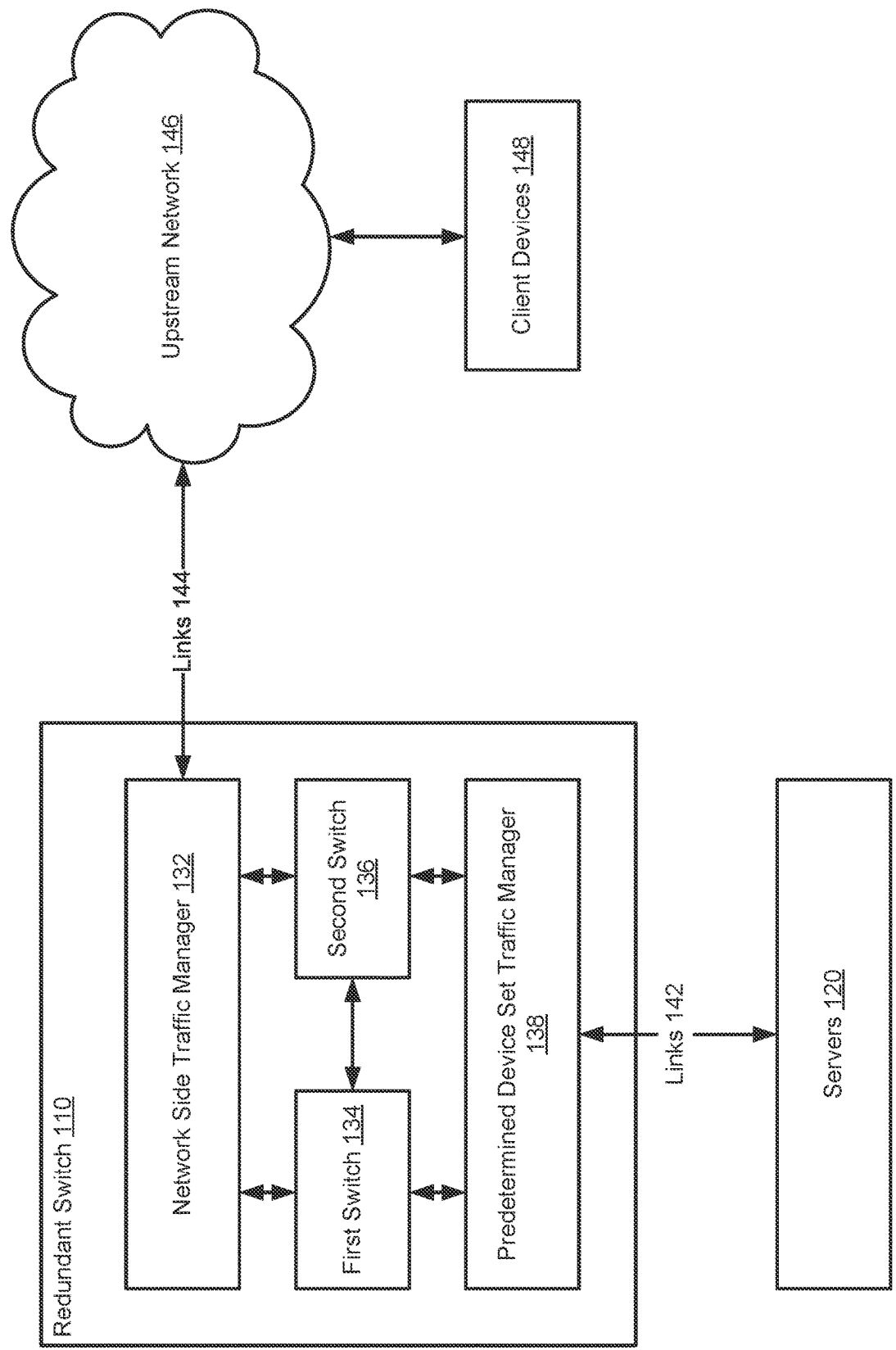
FIG. 1.2

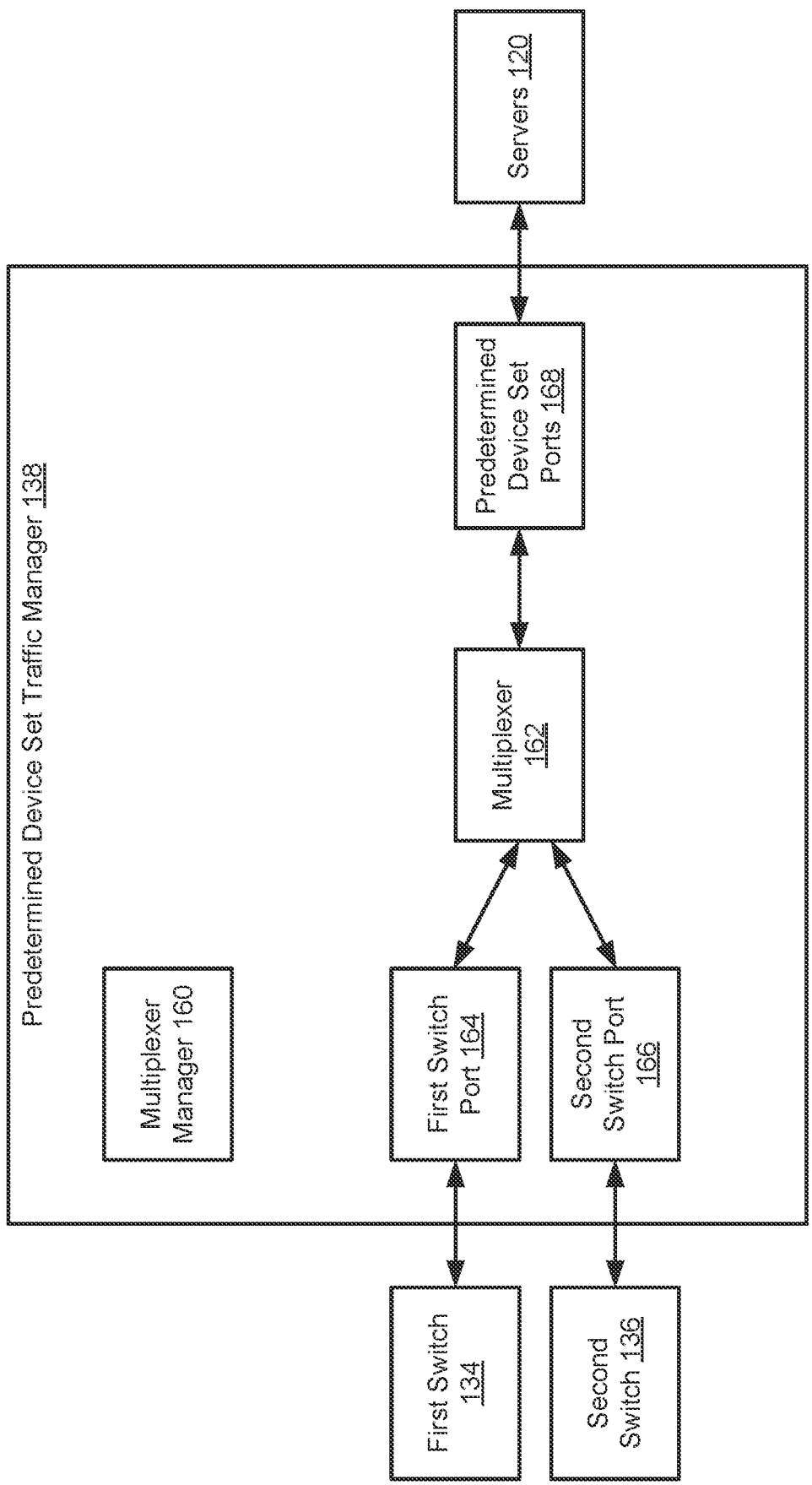
FIG. 1.3

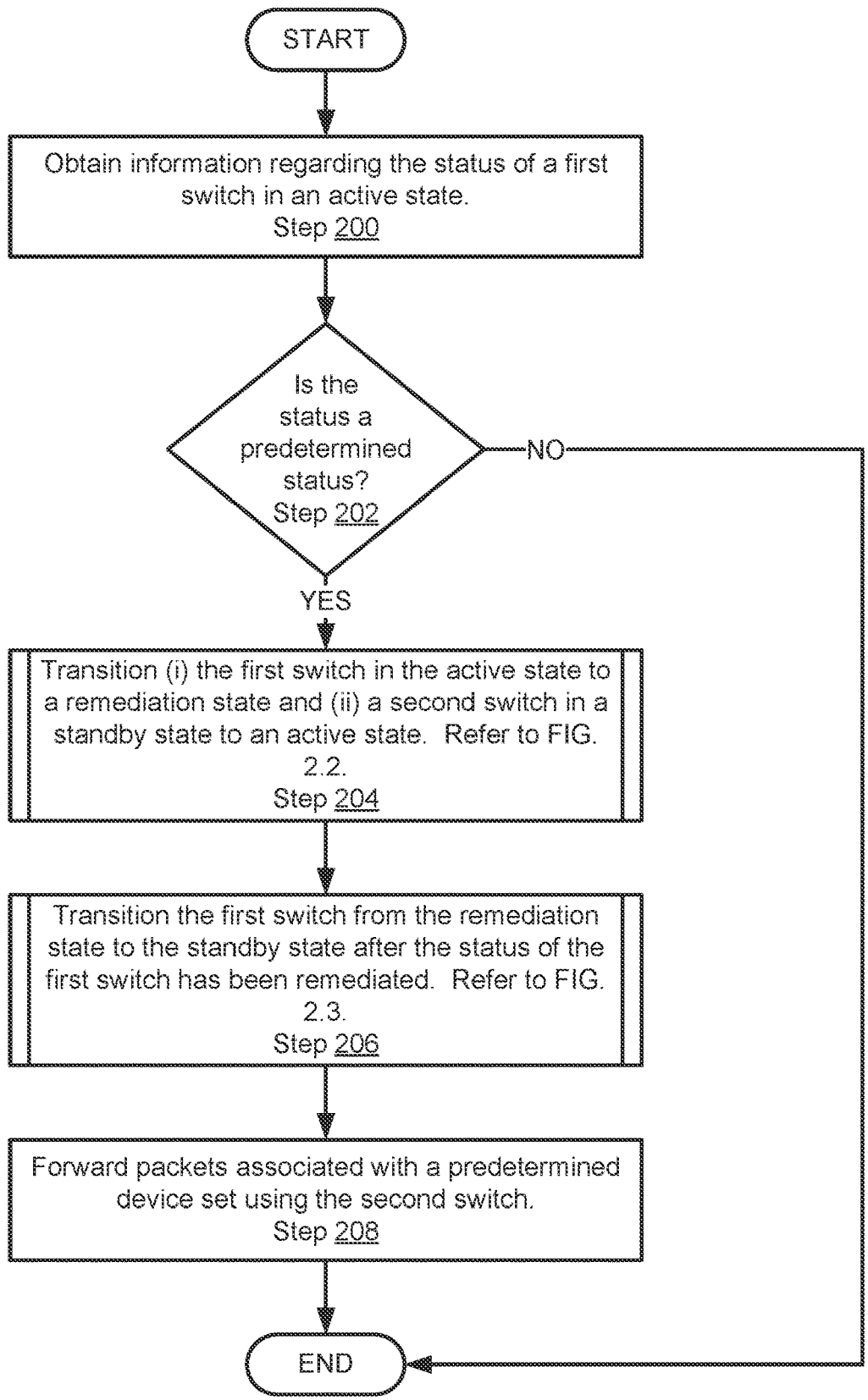
FIG. 2.1

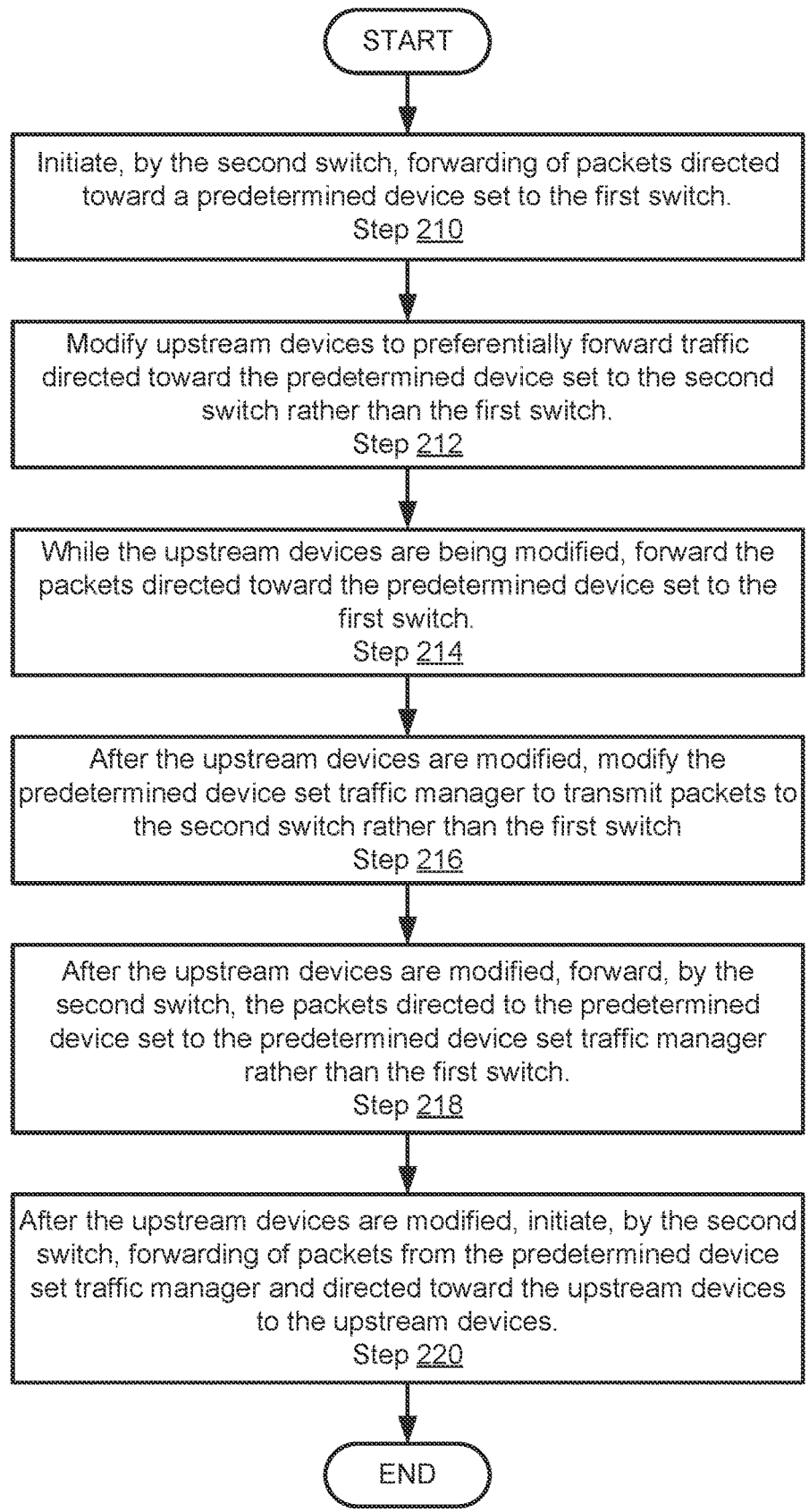
FIG. 2.2

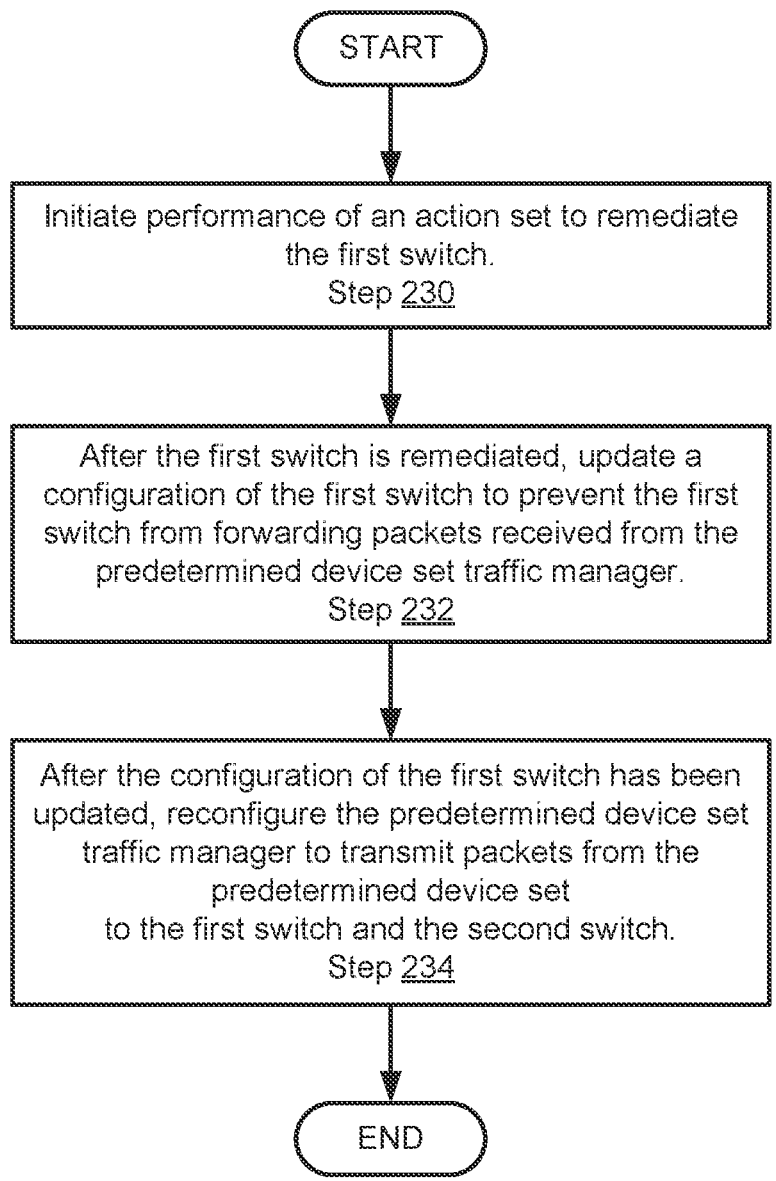
FIG. 2.3

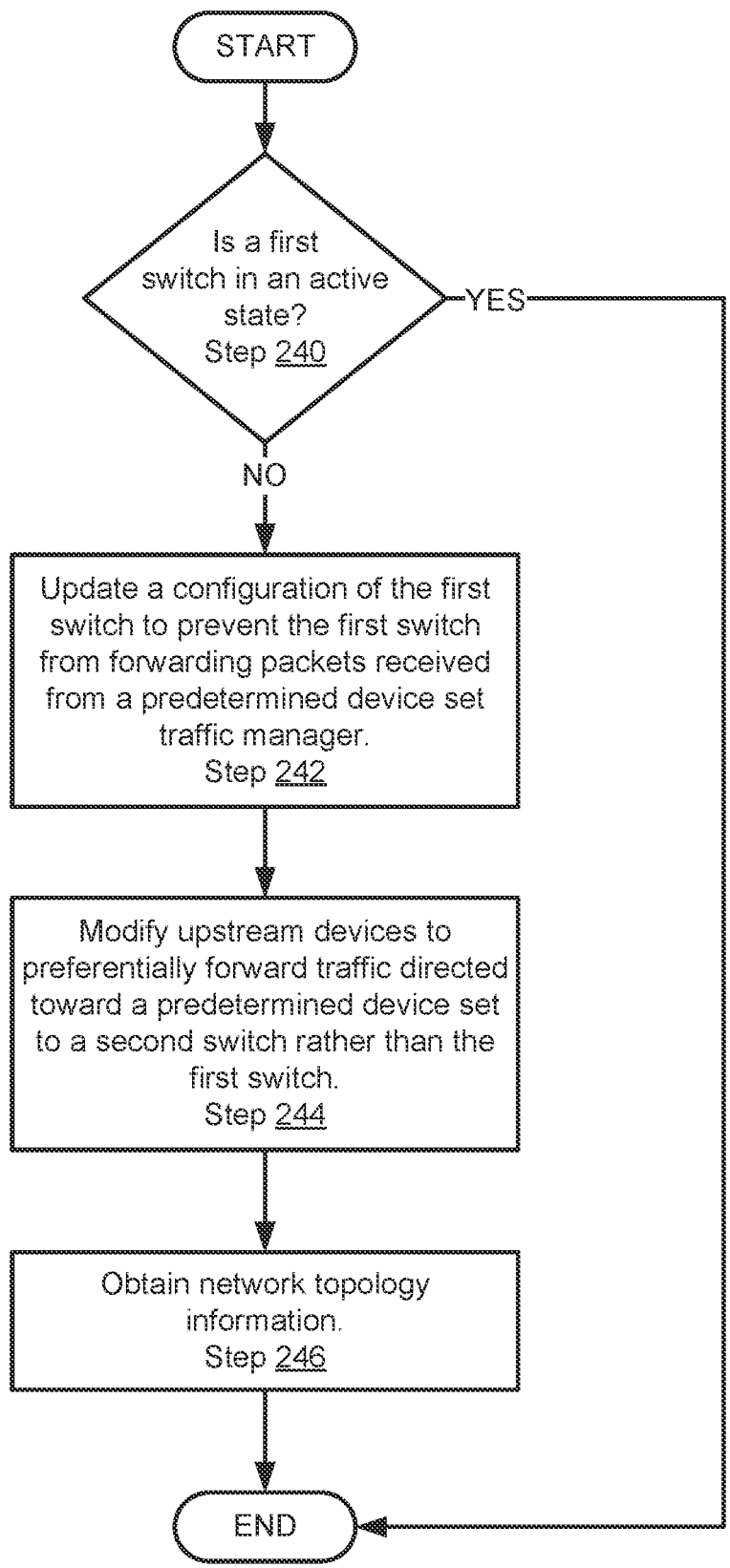
FIG. 2.4

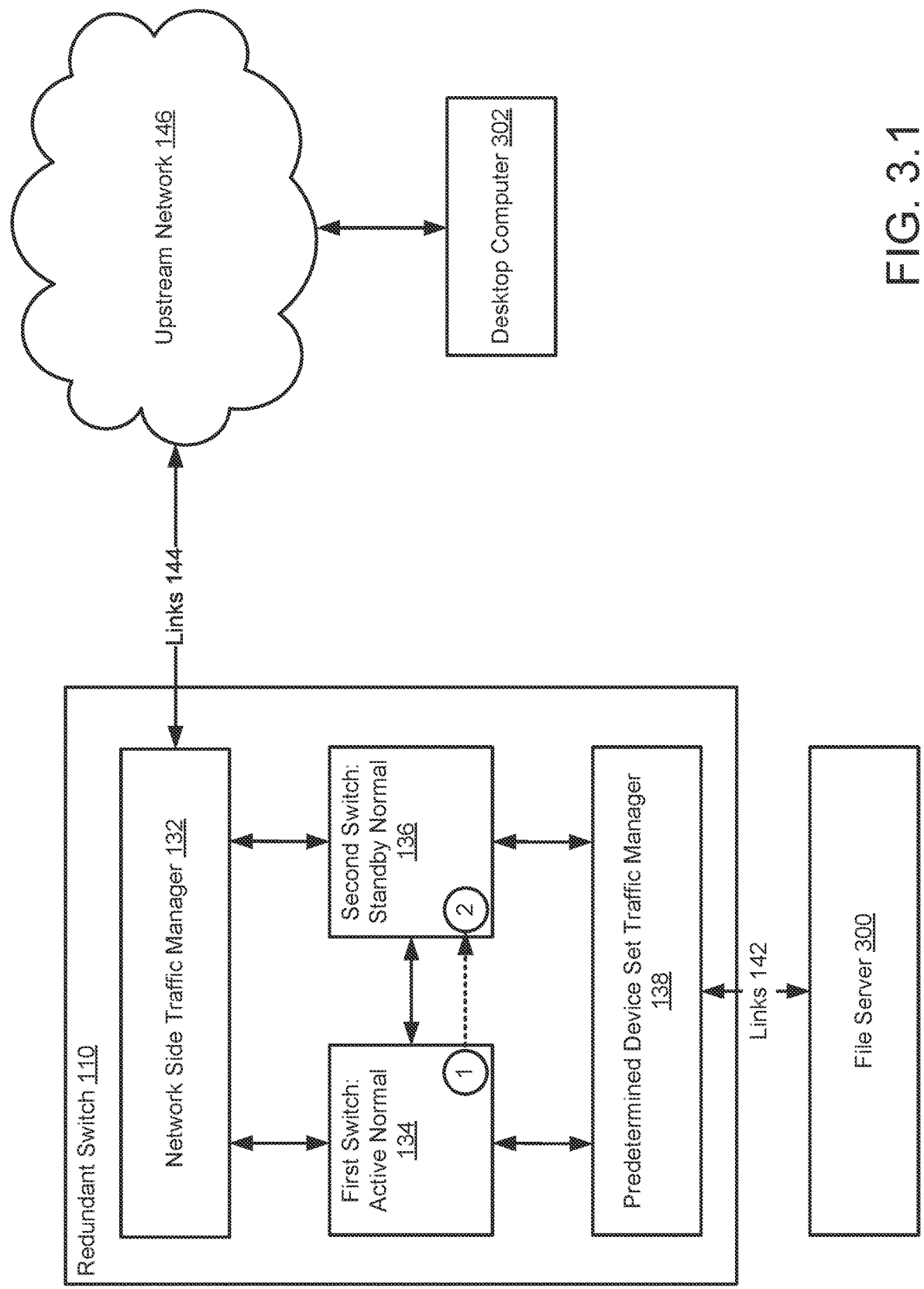
FIG. 3.1

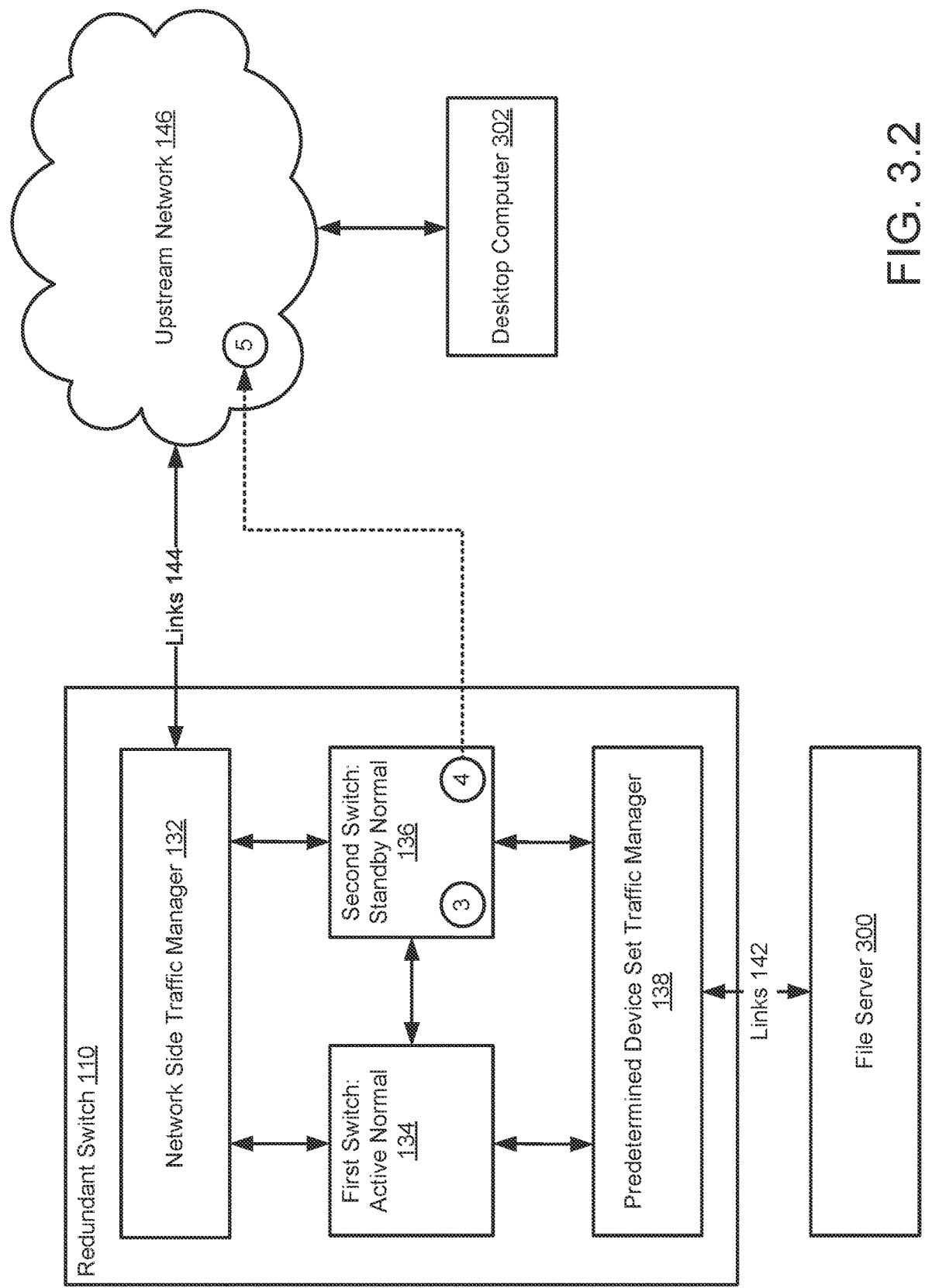
FIG. 3.2

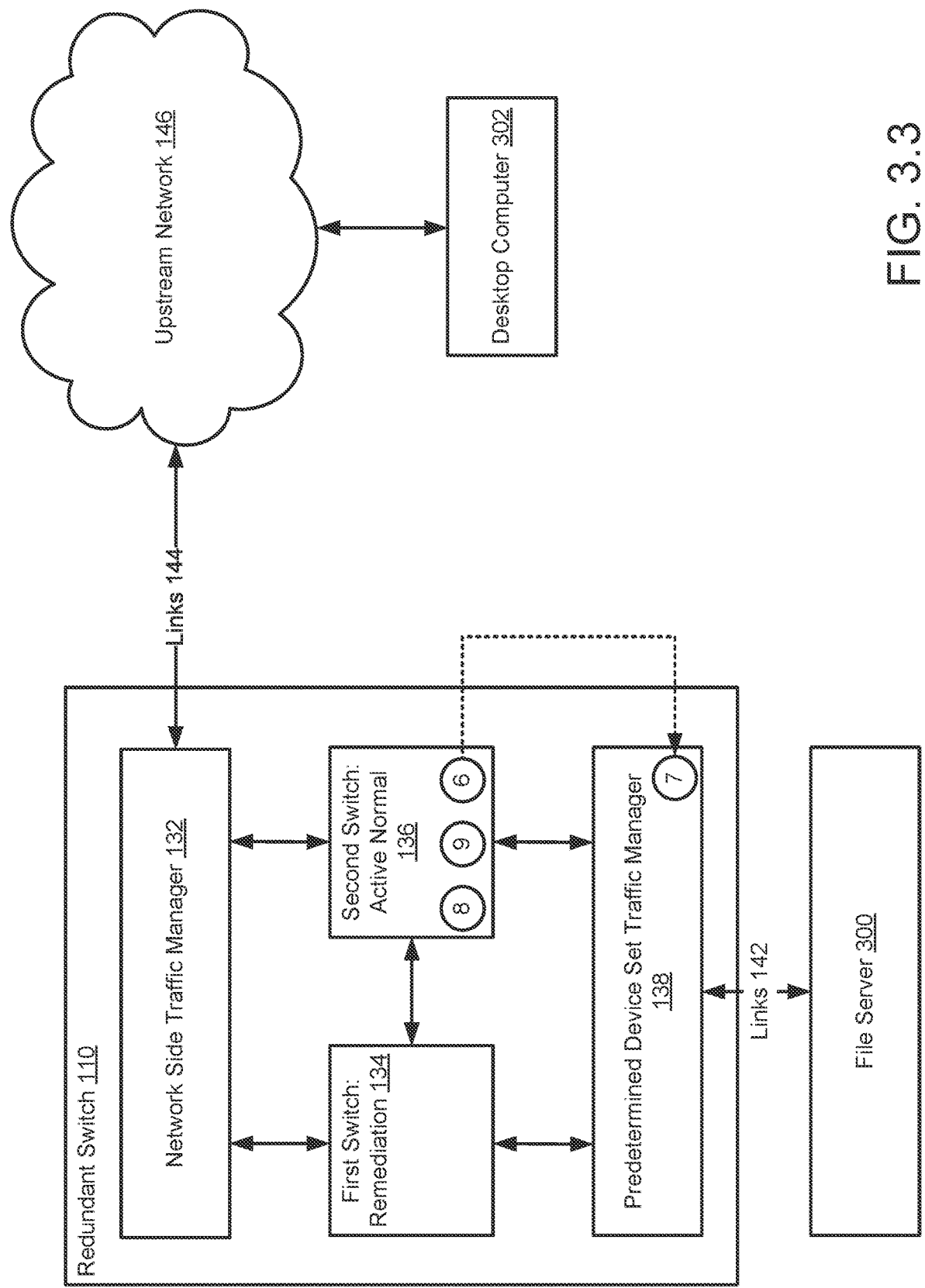
FIG. 3.3

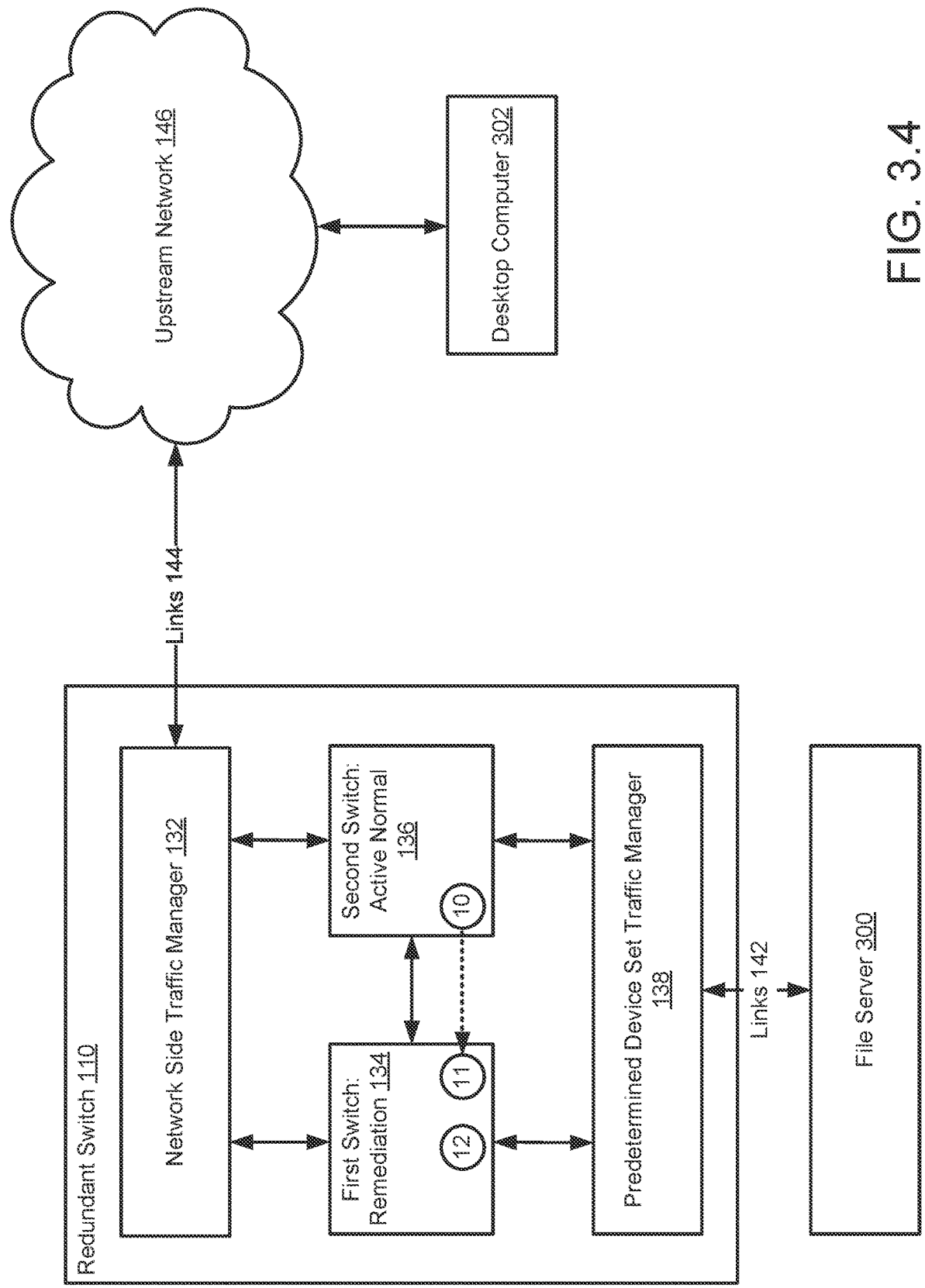
FIG. 3.4

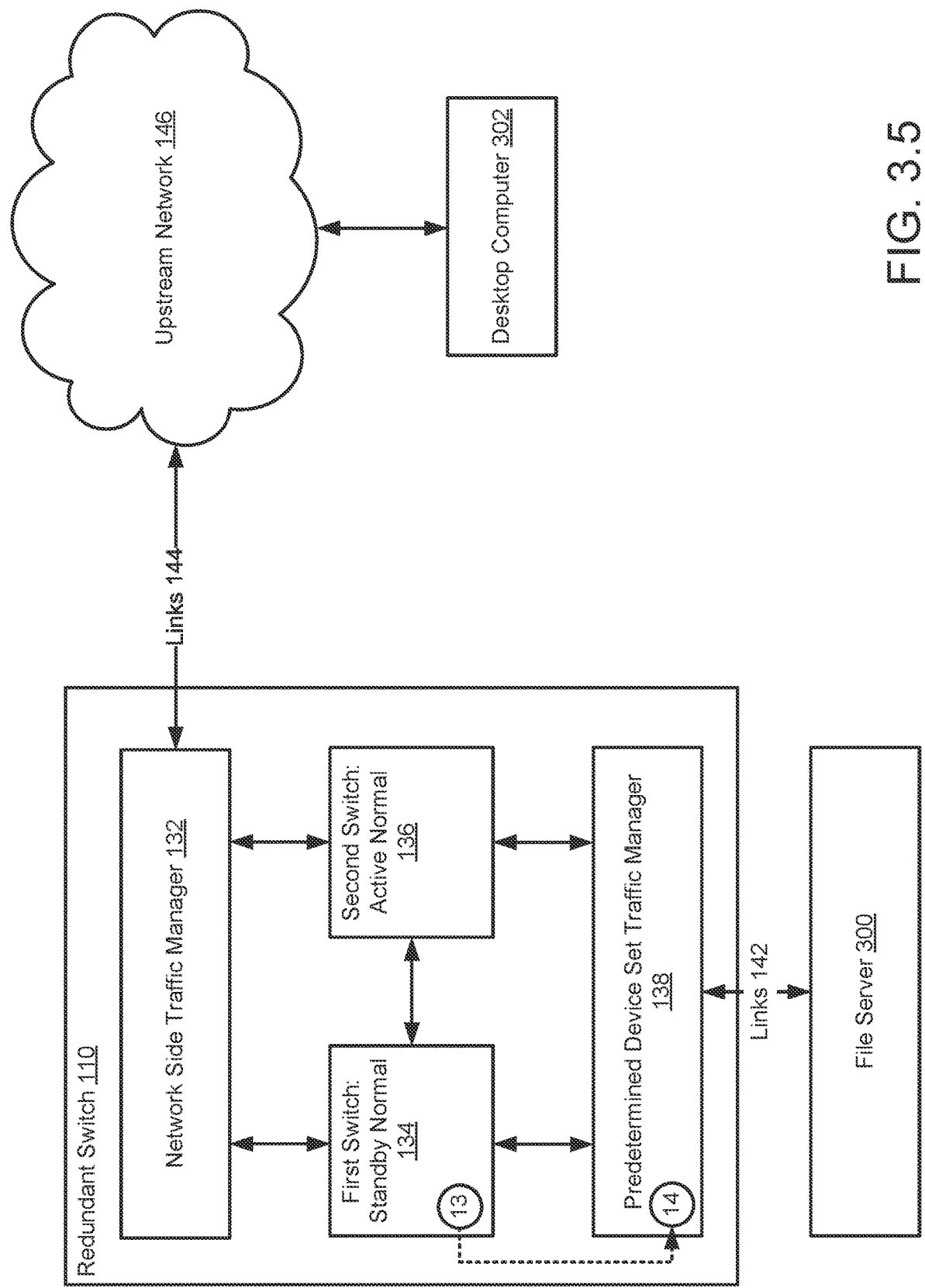
FIG. 3.5

NETWORK ELEMENT WITH DUAL INDEPENDENT SUB NETWORK ELEMENTS WITH SEAMLESS FAILOVER

CROSS-REFERENCE TO RELATED APPLICATIONS

This application claims benefit under 35 USC § 119(e) to U.S. Provisional Patent Application No. 62/984,572 filed on Mar. 3, 2020. U.S. Provisional Patent Application No. 62/984,572 is hereby incorporated by reference in its entirety.

BACKGROUND

A communication system may enable devices to communicate with one another. The communication system may include devices that relay information from a sending device to a destination device.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a logical diagram of a system in accordance with one or more embodiments disclosed herein.

FIG. 1.2 shows a logical diagram of a redundant switch in accordance with one or more embodiments disclosed herein.

FIG. 1.3 shows a logical diagram of a predetermined device set traffic manager in accordance with one or more embodiments disclosed herein.

FIG. 2.1 shows a flowchart of a method of performing a failover in accordance with one or more embodiments disclosed herein.

FIG. 2.2 shows a flowchart of a method of transitioning components of a redundant switch during a failover in accordance with one or more embodiments disclosed herein.

FIG. 2.3 shows a flowchart of a method of transitioning a component of a redundant switch from a remediation to a standby state during a failover in accordance with one or more embodiments disclosed herein.

FIG. 2.4 shows a flowchart of a method of operating a component of a redundant switching after a restart performing during a failover in accordance with one or more embodiments disclosed herein.

FIGS. 3.1-3.5 show a non-limiting example of a system over time.

DETAILED DESCRIPTION

Figure 4:
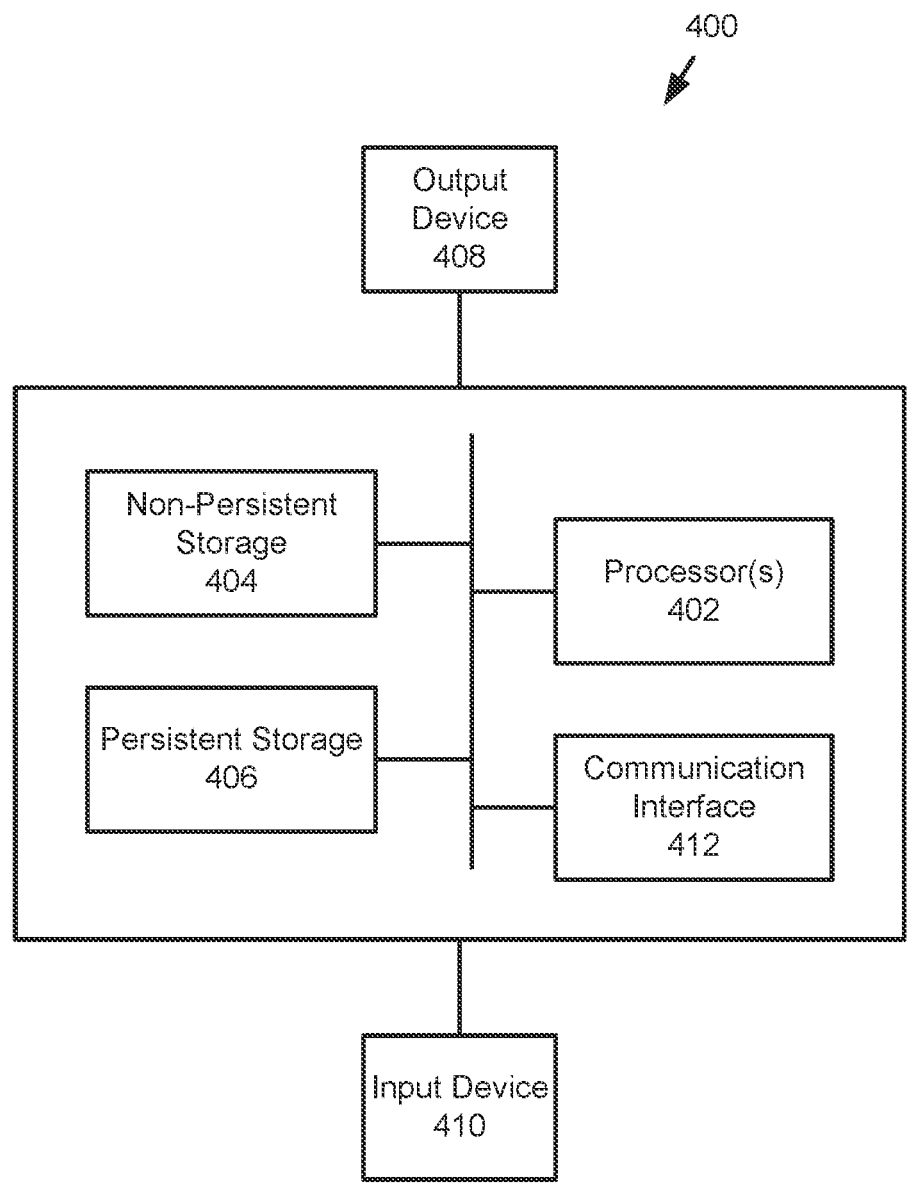
FIG. 4 shows a logical diagram of a computing device in accordance with one or more embodiments disclosed herein.

Networks include devices that forward packets (or other types of communication protocol compliant data structures) to facilitate communications. The topology of a network may limit the flow of packets through the network. For example, some devices may only be connected to a single packet forwarding device. Consequently, these devices may be unable to communicate with other devices if the single packet forwarding device is unable to provide packet forwarding services.

For example, consider a high density computing or networking environment in which a single top of rack switch provides network connectivity for a number of devices disposed within the rack. If the top of rack switch is unable to provide packet forwarding services, the devices disposed in the rack may be unable to communicate with each other and other devices outside of the rack.

One or more embodiments disclosed herein provide methods, devices, and systems for improving the likelihood that switches or other types of communication devices are able to provide packet forwarding (and/or other types of communications) services. Specifically, a communications device in accordance with embodiments disclosed herein may be a redundant switch that includes multiple switches.

The switches of the redundant switch may cooperatively provide packet forwarding services. To do so, at any point in time, one of the switches will be in an active mode in which it forwards packets. The other switches may be in standby mode. If the switch in active mode (e.g., active switch) must stop providing packet forwarding services for any reason, the standby switches and active switch perform a failover process where one of the standby switches becomes active and the active switch reverts to standby mode.

During the failover, the switches may cooperate to limit the quantity of packets lost and/or duplicated as well as to expedite the failover process. To do so, the switches may, prior to changing which switch is providing packet forwarding services, reconfigure the upstream network so that packets directed towards devices served by the switches are preferentially forwarded by the upstream network to the standby switch that will become active during the failover. Consequently, when the failover is performed, only the operation of the standby switch that is transitioning to active needs to be modified.

To prepare to transition to active mode in the future, the switches in standby may update their respective view of the network environment to match that of the active switch. By doing so, when a failover occurs, the newly active switch will make similar forwarding decisions to that of the previously active switch.

To improve the view of the network environment to all of the switches (including the standby switches that are not actively forwarding packets), the redundant switch may internally distribute packets to all active and standby switches. The standby switches may utilize these packets to improve their view of the network environment while the active switch may both forward the packets and utilize the packets to update its view of the network environment.

The failover process implemented by the redundant switch may be resilient to software failures on one of the switches of the redundant switch. For example, the failover process implemented by the redundant switch may not rely on the control plane of the switch that has entered an undesirable state. In a scenario in which the hardware components or other data plane entities of an active switch is able to continue to forward packets, the failover process implemented herein may not result in any (or very small amounts of) packet loss. Consequently, the failover process implemented by the redundant switch may appear seamless to other network entities.

In the text that follows, a description of components of a system in accordance with embodiments disclosed herein is provided with respect to FIGS. 1.1-1.3. A description of methods that may be performed by the system of FIG. 1.1 is provided with respect to FIGS. 2.1-2.4. An example of a series of actions that may be performed by the system of FIG. 1.1 is provided with respect to FIGS. 3.1-3.5. Lastly, a description of a computing device that may be used to implement the system of FIG. 1.1 is provided with respect to FIG. 4.

Specific embodiments will now be described with reference to the accompanying figures. In the following description, numerous details are set forth as examples. It will be understood by those skilled in the art, and having the benefit of this document, which one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

FIG. 1.1 shows a diagram of an example system in accordance with one or more embodiments described herein. The system may include enclosure (100) that houses any number of devices. Enclosure (100) may be part of a high density computing and/or networking environment. Enclosure (100) may be implemented using a physical structure usable to position, orient, and/or house the devices.

For example, enclosure (100) may be implemented using a rack that houses any number of chassis. The chassis may house any number and type of devices such as, for example, computing devices, network devices, and/or other types of devices. Enclosure (100) may be implemented using other types of structures without departing from embodiments disclosed herein. While the system in FIG. 1.1 is illustrated as including a single enclosure, a system in accordance with embodiments disclosed herein may include any number of enclosures that each house any number and type of devices. Different enclosures may house similar and/or different numbers and/or types of devices.

The devices housed in enclosure (100) may include servers (120) (and/or other types of devices not illustrated in FIG. 1.1). Servers (120) may provide computer implemented services. Servers (120) may provide any number and type of computer implemented services. The computer implemented services may include, for example, electronic communication services, data storage services, workload processing services, instant messaging services, database services, etc. Servers (120) may provide other and/or different types of computer implemented services without departing from embodiments disclosed herein.

To provide the computer implemented services, servers (120) may communicate with each other and/or devices not illustrated in FIG. 1.1 (e.g., devices outside of enclosure (100)). For example, to provide instant messaging services, an application hosted by a server may generate a data structure for a communication. The data structure may be transmitted to another server or other device via one or more packets (e.g., network packets that include a portion of the data structure to be transmitted to a recipient and control information for managing the network packets in a packet-switched network environment) or other types of structures (e.g., other than packets) for transmitting data in a network environment. The data structure may be used to display the communication to a recipient. If servers (120) are unable to communicate with each other and/or other devices, servers (120) may be unable to provide all, or a portion, of their computer implemented services.

Enclosure (100) may include redundant switch (110). Redundant switch (110) may be operably connected to each of servers (120) and other devices not illustrated in FIG. 1.1. For example, servers (120) may be connected to redundant switch (110) via an Ethernet network and redundant switch (110) may be connected to other devices via one or more optical connections or other high data rate communication mediums supporting a packet-switched network (or other type of network). Redundant switch (110) may be connected to servers (120) and other devices via other types of connections and/or networks without departing from embodiments disclosed herein.

In one or more embodiments disclosed herein, each of servers (120) is connected to redundant switch (110) via a single connection. For example, each of servers (120) may be connected to redundant switch (110) via a single cable (as opposed to a multi-connection scheme in which each of servers (120) is redundantly connected to at least two switches). By only being connected to redundant switch (110) via a single connection (and/or not being connected to other devices that may facilitate communications), the physical cabling between servers (120) and redundant switch (110) may be reduced when compared to redundant connection configurations. Similarly, the complexity of servers (120) may be reduced by only requiring one available port for communications. However, a failure (or other type of a reduced capability state) of redundant switch (110) may leave servers (120) unable to communicate with each other and/or other devices by virtue of lacking redundant connections via multiple, independent switches.

Embodiments disclosed herein may provide methods, devices, and/or systems for facilitating communications between servers (120) and other devices. To facilitate communications between servers (120) and other devices, redundant switch (110) may forward packets or other types of data structures transmitted between the servers (120) and the other devices.

To improve the likelihood that redundant switch (110) is able to forward packets, redundant switch (110) may include multiple internal switches. At any point in time, one of these internal switches may be operating in an active mode. While in the active mode, the active switch may forward packets received from other devices and servers (120).

The other switches (e.g., standby switches) of redundant switch (110) may be in standby mode. While in standby mode, these other switches may observe packets being transmitted between servers (120) and other devices but may not actively forward the packets. By observing the packets, the standby switches may learn information about their network environment in preparation for becoming an active switch.

The switches of the redundant switch (110) may monitor the status of the other switches. The status of the switches may indicate whether a switch is likely or unlikely to be able to forward packets and/or perform its other functions. The status of the switches may be based on, for example, health information regarding components of the switches and/or other information that may indicate whether a switch will be likely or unlikely to be able to provide its functionality.

If an active switch appears to have an undesired status (e.g., one that indicates the active switch is unlikely to be able to provide its functionality), the standby switches may initiate a failover process (e.g., a switch failover). During the failover process, the active switch may be placed in a remediation state and one of the standby switches may be placed in the active state. By doing so, redundant switch (110) may continue to forward packets while the operation of the switch in the remediation state is modified to place the switch in a desired status (e.g., one that indicates that it is likely that the switch will be able to forward packets and/or provide its other functions).

The failover process performed by the switches may limit the quantity of packets that are dropped and/or duplicated by (i) presenting each of the switches as separate devices to upstream devices (e.g., devices that are not local to redundant switch (110)) and (ii) presenting all of the switches as the same device to servers (120) and/or other local devices (e.g., devices that only require a layer 2 network (i.e., broadcast) to reach and/or are directly connected to the redundant switch (110)). By presenting the switches of redundant switch (110) in this manner, upstream devices may be reconfigured (and the upstream network may converge) prior to transitioning a standby switch to the active state and the active switch to another state. Consequently, when an active switch is placed in standby mode, the upstream network may already preferentially direct packets to the standby switch before the failover is performed. Accordingly, a reduced number of packets may be dropped due to this change in operating state of the active switch when compared to a scenario in which the states of the active switch and standby switch change prior to convergence of the upstream network based on the new topology.

Additionally, by presenting all switches of redundant switch (110) as the same switch to servers (120), when a switch failover occurs the transition may be transparent to servers (120). Prior to transitioning to the active state, a standby switch may update its forwarding information (and other information regarding the network environment) to match that of the active switch's information. When the switch failover occurs, the standby switch may immediately begin forwarding packets in a manner identical to that of the active switch (now in a remediation state).

For additional details regarding redundant switch (110), refer to FIGS. 1.2 and 1.3. For additional details regarding a fail over process that may be performed by redundant switch (110), refer to FIGS. 2.1-2.4.

Any of the components of FIG. 1.1 may be operably connected by any combination and/or number of wired and/or wireless connections. For example, servers (120) may be connected to redundant switch (110) via a wired broadcast network while redundant switch (110) may be connected to other devices (not illustrated) by a higher layer network.

Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.4. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices (refer to FIG. 4) to provide their respective functionalities. The devices of FIG. 1.1 may be implemented using other types of logical devices without departing from the embodiments disclosed herein.

As discussed above, the system of FIG. 1.1 may utilize redundant switch (110) to provide communication services to servers (120) and other devices. FIG. 1.2 shows a logical diagram of redundant switch (110) in accordance with one or more embodiments described herein.

To provide the above noted functionality of redundant switch (110), redundant switch (110) may include network side traffic manager (132), first switch (134), second switch (136), and predetermined device set traffic manager (138). Each of these components of redundant switch (110) is discussed below.

First switch (134) and second switch (136) may cooperatively provide packet forwarding services to facilitate communications between servers (120) and upstream devices (e.g., client devices (148)). Specifically, these switches may redundantly provide packet forwarding services by (i) electing one of the switches to be in an active switch in which the elected switch forwards packets, (ii) electing one of the switches to be in a standby state in which the standby switch monitors packets without forwarding them, and (iii) performing a failover when the status of the active switch enters a predetermined status to place the standby switch into an active state and the active switch into a remediation state. By doing so, packets may continue to be forwarded by the switches (e.g., 134, 136) during failover of the switches.

To facilitate failover, switches (134, 136) may present themselves as different devices to upstream devices (e.g., 146, 148) and as the same device to devices of a predetermined device set. The predetermined device set may include the servers (120) and/or devices. For example, the predetermined device set may include all local devices connected to redundant switch (110) via a broadcast network (e.g., to all devices which the multiple switches of redundant switch (110) present themselves as being the same switch).

To present the switches as different devices to the upstream devices, switches (134, 136) may advertise separate, distinguishable reachability information to the upstream devices. To present switches (134, 136) as the same device to the predetermined device set, switches (134, 136) may utilize a same media access control address when forwarding packets to the predetermined device set. For example, switches (134, 136) may use a virtual media access control address (rather than a burnt in media access control address) when forwarding packets to the predetermined device set.

Switches (134, 136) may also maintain consistent network information to facilitate failover. For example, switches (134, 136) may exchange network information with each other and coordinate with one another to ensure that both switches (134, 136) have the same information regarding the network environment in which they exist. Consequently, when a failover occurs, either switch will make the same decisions regarding forwarding of packets. Switches (134, 136) may utilize any number and type of mechanisms for maintaining consistent network information. These mechanisms may include, but are not limited to, the following mechanisms: (i) observing all packets traversing redundant switch (110) (even if not explicitly directed toward a particular switch), (ii) exchanging network information between switches (134, 136), and (iii) initiating network discovery protocols (e.g., sending address resolution protocol (ARP) messages).

To determine when to perform a failover, switches (134, 136) may monitor the statuses of switches (134, 136). The statuses of switches (134, 136) may indicate whether each switch is likely to be able to successfully forward packets and/or whether a switch should be remediated for other reasons. Remediating a switch may change the operation of the switch thereby changing the status of the switch. A switch may be remediated by performing an action set which may include, but is not limited to: (i) restarting the switch, (ii) changing the configuration of the switch, (iii) notifying a person regarding the status of the switch, and (iv) performing other types of actions.

Switches (134, 136) may monitor the statuses of the switches by collecting any type and quantity of information. The information may be collected using any mechanism. The information may include, for example, (i) health information regarding a switch, (ii) administrative decisions such as installing new/different software, (iii) detection of a change in a hardware or software heartbeat of the switch, (iv) a notification by the switch indicative of its status, (v) information from another device (e.g., an upstream entity, a management entity, etc.) indicative of the state of the switch, and/or (vi) other types of information. The information may be collected via any method (e.g., push/pull, publish/subscribe, etc.) and from any entity.

First switch (134) and second switch (136) may each include general packet forwarding functionality and special packet forwarding functionality for packets directed toward the predetermined device set. General packet forwarding functionality may include (i) obtaining packets from network side traffic manager (132), predetermined device set traffic manager (138), and/or other devices, (ii) determining to which device the packets are to be forwarded (if not destined to terminate in the switches), and (iii) transmitting the packets toward the determined device.

Special packet forwarding functionality may include, while not performing a failover, (i) identifying that an obtained packet is directed towards a device of a predetermined device set and (ii) either forwarding or observing without forwarding the packet depending on whether the switch is in an active state or in a standby state. If the switch is in the active state, then the switch may forward the identified packet. Otherwise, if in the standby state, then switch may only observe the packet without forwarding the packet.

Special packet forwarding functionality may further include, while performing a failover, (i) identifying that an obtained packet is directed towards a device of a predetermined device set, (ii) if the switch is in the standby state, updating the identified packet so that the switch in the active state will forward the updated identified packet and forwarding the updated identified packet to the active switch, and (iii) if the switch is in the active state, forwarding the identified packet.

To provide the above packet forwarding functionality, switches (134, 136) may include programmable packet processors. The programmable packet processors may be programmable hardware devices adapted to classify and determine how to forward packets. The programmable packet processors may provide a programmable packet forwarding pipeline that allows packets to be (i) classified based on any number and type of rules (e.g., that operate on control information of the packets), (ii) decapsulated and/or encapsulated based on the classification, and (iii) transmitted to any number of devices via any number of ports of the respective switches based on the classification.

To program the programmable packet processors, switches (134, 136) may obtain any type and quantity of information regarding the network environment in which switches (134, 136) reside. Switches (134, 136) may utilize any mechanism for obtaining the information regarding the network environment. For example, switches (134, 136) may utilize network protocol compliant discovery mechanisms (e.g., ARPing, interrogating received packets, exchanging information with other switches, etc.) to obtain the information.

When programming the packet processors, some of the rules and/or tables may be programmed to modify the forwarding decisions made by the switch based on the switches state. For example, when in the standby state, the rules implemented by the packet processors may cause packets from the predetermined device set to be dropped rather than forwarded. Any number of such rules may be programmed into the packet processors to implement the packet forwarding behavior of the switches discussed throughout this application. Programming the packet processors may include storing data structures corresponding to the rules in predetermined storage locations within the packet processors.

In one or more embodiments disclosed herein, switches (134, 136) may be implemented using layer 3 (e.g., a multilayer switch) or higher layer switches or routers.

Switches (134, 136) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.4. Switches (134, 136) may be implemented using other types of computing devices without departing from the embodiments disclosed herein. For additional details regarding computing devices, refer to FIG. 4.

Network side traffic manager (132) may be operably connected to switches (134, 136). For example, network side traffic manager (132) may be implemented using line cards that are operably connected to switches (134, 136). The line cards may include optical models or other high data rate communication devices that are connectable to upstream network (146) via links (144). Links (144) may be implemented using any medium including, for example, fiber optic cables, copper lines, or other transmission mediums.

Network side traffic manager (132) may transmit packets from switches (134, 136) to upstream network (146). Network side traffic manager (132) may also receive packets from upstream network (146) and transmit the packets to switches (134, 136). Because each of switches (134, 136) may advertise themselves as being different devices to upstream devices, the packets that network side traffic manager (132) receives from upstream devices may include control information that indicates that the packets should only be provided to first switch (134) or second switch (136). However, network side traffic manager (132) may transmit copies of all packets received from upstream devices to both first switch (134) and second switch (136). Consequently, all switches (134, 136) of redundant switch (110) may be exposed to all packets received by redundant switch (110) thereby enabling all switches to perform network learning using the packets.

Predetermined device set traffic manager (138) may operably connect switches (134, 136) to devices (e.g., servers (120)) of predetermined device set via links (142). Predetermined device set traffic manager (138) may manage the flow of packets between these devices.

To manage the flow of packets between predetermined device set devices and switches (134, 136), predetermined device set traffic manager (138) may be adapted to transmit packets from the predetermined device set to one or all of switches (134). For example, predetermined device set traffic manager (138) may obtain packets from servers (120) and either (i) transmit the packets to first switch (134) while first switch (134) is in the active state and second switch (136) is in the remediation state, transmit the packets to second switch (136) while second switch (136) is in the active state and first switch (134) is in the remediation state, or transmit the packets to both first switch (134) and second switch (136) while neither switch is in the remediation state. As will be discussed in greater detail below, by doing so, predetermined device set traffic manager (138) may prevent duplicative transmission of packets by switches (134, 136) during failover.

To manage the flow of packets between switches (134, 136) and the devices (e.g., 120) of the predetermined device set, predetermined device set traffic manager (138) may be adapted to only transmit packets from the active switch to the predetermined device set devices. In other words, if predetermined device set traffic manager (138) receives a packet from a switch in standby mode, then predetermined device set traffic manager (138) may not transmit the packet towards predetermined device set of devices. For additional details regarding predetermined device set traffic manager (138), refer to FIG. 1.3.

Links (142) may be implemented using any suitable transmission medium including, for example, Ethernet cables and/or other types of cabling.

By implementing redundant switch (110) as discussed above, embodiments enclosed herein may improve the likelihood that a predetermined device set of devices is able to communicate with upstream devices such as, for example, upstream network (146) and client devices (148).

For example, devices of the predetermined device set may provide computer implemented services that require communication with client devices (148). Client devices (148) may be operably connected to redundant switch (110) via upstream network (146). Redundant switch may include at least two switches (e.g., 134, 136, in FIG. 1.2 but redundant switch (110) may include additional switches beyond those illustrated in FIG. 1.2) that cooperatively provide packet forwarding switches for the predetermined device set. Redundant switch (110) may be connected to each device of the predetermined device set by a single cable (e.g., links (142)), thereby reducing cabling complexity when compared to multiple cable implementations. In the event of a failure of the active switch, one of the standby switches may automatically begin packet forwarding. During the failover, predetermined device set traffic manager (138) may enable the standby switch to begin to forward packet via the links and prevent the active switch from forwarding packets via the links (142). Accordingly, the failover may be transparent to the predetermined device set.

To further clarify its operation, a logical diagram of predetermined device set traffic manager (138) in accordance with one or more embodiments described herein is shown in FIG. 1.3. As discussed above, predetermined device set traffic manager (138) may selectively transmit packets between switches and devices of a predetermined device set.

To provide the above noted functionality, predetermined device set traffic manager (138) may include multiplexer manager (160), multiplexer (162), first switch port (164), second switch port (166), and predetermined device set ports (168).

First switch port (164), second switch port (166), and predetermined device set ports (168) may be ports that operably connect multiplexer (162) to first switch (134), second switch (136), and servers (120), respectively. The ports may be connected to these devices via any suitable medium (e.g., cabling type). Predetermined device set ports (168) may include ports corresponding to each of the servers (120). These ports may be connected to respective servers (120) via a single medium (e.g., cable).

In some embodiments disclosed herein, other communications devices may be interposed between predetermined device set ports (168) and servers (120). For example, an additional switch or other type of communication device may be disposed between predetermined device set ports (168) and servers (120) (e.g., thereby providing an additional 1:N set of ports thereby allowing predetermined device set ports (168) to only include a single port while still allowing any number of devices from a predetermined device set to be operably connected to multiplexer (162)).

In some embodiments disclosed herein, other communications devices may be interposed between first switch port (164) and second switch port (166) and the respective first switch (134) and second switch (136).

Multiplexer (162) may manage transmission of packets between first switch (134), second switch (136), and devices of a predetermined device set. Multiplexer (162) may be a reconfigurable device. Specifically, multiplexer (162) may, for packets from a predetermined device set operably connected to the predetermined device set ports (168), be configurable to selectively direct the packets to (i) only first switch (134), only second switch (136), and both of first switch (134) and second switch (136).

Multiplexer (162) may also be configurable to drop packets from the first switch (134) or the second switch (136).

Multiplexer (162) may be reconfigured by multiplexer manager (160). Multiplexer manager (160) may reconfigure multiplexer (162) based on whether a switch failover is being performed and which switch is in an active state.

For example, when a switch failover is being performed, the multiplexer manager (160) may reconfigure the multiplexer (162) to not forward packets from the predetermined device set to the switch that is in the remediation state (e.g., only forwards packets to the active switch during the failover). When a failover is not being performed, multiplexer manager (160) may reconfigure multiplexer (162) to transmit packets from the predetermined device set to all switches (e.g., both active and standby switches).

In another example, the multiplexer manager (160) may reconfigure the multiplexer (162) to only transmit packets from the active switch to the predetermined device set. The multiplexer (162) may drop any packets received from switches in standby/remediation states.

Multiplexer manager (160) may dynamically reconfigure multiplexer (162) as the states of the switches change over time. The multiplexer manager (160) may do so by actively and/or passively obtaining information regarding the states of the switches.

For example, multiplexer manager (160) may actively monitor (e.g., request state information) the states of the switches and perform reconfigurations of multiplexer (162) based on the active monitoring. In another example, multiplexer manager (160) may passively monitor (e.g., be provided with information regarding the states and/or be told how to reconfigure multiplexer (162) by other entities) the states of the switches and perform reconfigurations of multiplexer (162) based on the passive monitoring. Multiplexer manager (160) may obtain the information via any method (e.g., push/pull, publish/subscribe, message passing, etc.) without departing from embodiments disclosed herein.

For example, multiplexer manager (160) may be connected to the switches of a redundant switch via a shared or exclusive communication bus (e.g., serial, I2C, etc.). Multiplexer manager (160) and the switches may exchange information that enables multiplexer manager (160) to reconfigure multiplexer (162), as discussed above.

In one or more embodiments disclosed herein, multiplexer manager (160) and/or multiplexer (162) are each implemented using a hardware device including circuitry. Multiplexer manager (160) and/or multiplexer (162) may include, for example, one or more of a digital signal processor, a field programmable gate array, and/or an application specific integrated circuit. The circuitry of the aforementioned devices may be adapted to provide the functionality of multiplexer manager (160) and/or multiplexer (162). Multiplexer manager (160) and/or multiplexer (162) may be implemented using other types of hardware devices without departing from the embodiments disclosed herein.

In one or more embodiments disclosed herein, multiplexer manager (160) and/or multiplexer (162) are implemented using computing code stored on a persistent storage that when executed by a processor of predetermined device set traffic manager (138) performs the functionality of multiplexer manager (160) and/or multiplexer (162). The processor may be a hardware processor including circuitry such as, for example, a central processing unit or a microcontroller. The processor may be other types of hardware devices for processing digital information without departing from the embodiments disclosed herein.

As discussed above, the system of FIG. 1.1 may facilitate communications between servers and other types of devices of a predetermined device set with other devices. FIGS. 2.1-2.4 show diagrams of methods that may be performed by components of the system of FIG. 1.1 in accordance with one or more embodiments disclosed herein to facilitate communications.

FIG. 2.1 shows a flowchart describing a method for managing the operation of a network in accordance with one or more embodiments disclosed herein. The method may be performed by, for example, a redundant switch (e.g., 110, FIG. 1.1). Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in some manner.

In step 200, information regarding the status of a first switch in an active state is obtained. The first switch may be part of a redundant switch. The information may be obtained by a second switch of the redundant switch. The second switch may be in a standby state.

The status may indicate whether the first switch will be remediated. For example, the status may indicate that the first switch will be unlikely to forward packets in a desired manner in the future or that the switch should be remediated for other reasons.

The information may include any type and quantity of information indicative of the status of the first switch. The information may include, for example, health information regarding hardware and/or software components of the first switch, information regarding a heartbeat mechanism of the first switch, and/or administrative information such as the presence of a software update that is to be deployed to the first switch.

The information may be obtained via any mechanism and from any source. For example, the information may be obtained from the first switch, a management entity, or another entity (e.g., part of the upstream network/devices, the predetermined device set, etc.). The information may be obtained via any communication scheme including, for example, message passing systems, publish/subscribe systems, etc.

In step 202, it is determined whether the status is a predetermined status. The first switch may have any number of statuses. The information regarding the status may be used to determine the status of the first switch. The status of the first switch may then be compared to the predetermined status. If the status matches the predetermined status, then the method may proceed to step 204. If the status does not match the predetermined status, then the method may end following step 202.

The determination in step 202 may be made using any comparison mechanism. For example, the predetermined status may correspond to a range of statuses of the first switch. If the status of the first switch matches any that fall in the range (or ranges) of statuses of the first switch, then the status may be considered to match the predetermined status.

The range of statuses may be stored as part of a data structure maintained by the second switch. The first switch and the second switch may each maintain a copy of the data structure. The contents of the data structure may be obtained via any method (e.g., programmed by an administrator, heuristically determined, etc.) without departing from embodiments disclosed herein.

In one or more embodiments disclosed herein, the predetermined status indicates that the switch should be remediated. For example, the predetermined status may be one in which an administrative decision has been made that requires a modification or restart of the switch, that a health reporting function of the switch has indicated that all or a portion of the switch is not operating in a desired manner, and/or for other reasons. Thus, if the status of the switch matches the predetermined status, the match indicates that the switch should enter the remediation state.

In step 204, the first switch in the active state is transitioned to a remediation state and the second switch in the standby state is transitioned to the active state.

As discussed above, while in the active state, a switch may forward packets that it receives. In contrast, while in the standby state, a switch may not forward packets that it receives. Rather, it may observe the packets and perform network environment learning based on the observed packets. In both active and standby states, a network device may update the operation of its packet processors (e.g., by reprogramming them using learned information). Consequently, switches in both active and standby modes may obtain the same information regarding the network environment thereby enabling them to similarly update the operation of their packet processors.

In contrast, while in the remediation state, a switch may not continue to obtain information regarding its network environment. For example, while in the remediation state, the switch may restart thereby preventing it from receiving some packets.

The switch may also not be provided with all of the packets traversing through the redundant switch. For example, the predetermined device set traffic manager may not send packets to a switch that is in the remediation state.

The first switch may be transitioned to the remediation state by (i) redirecting traffic (e.g., packets from any number of devices) directed to the first switch from upstream devices to the standby switch and (ii) after redirecting the traffic, initiating remediation of the switch. By doing so, when the first switch is transitioning to the remediation state, it may be unlikely to receive packets from the upstream entities which may be dropped due to the first switch restarting or performing other actions as part of its remediation.

The second switch in the standby state may be transitioned to the active state by initiating packet forwarding by the second switch.

As noted above, the predetermined device set traffic manager may automatically adjust its operation (or be directed to change as part of the failover orchestrated by the switches) in response to the changes in state of the switches of the redundant switch. In this case, the predetermined device set traffic manager may change its operation to only forward packets from the predetermined device set to the second switch when it enters the active state. Consequently, packets from the predetermined device set may continue to be forwarded by the second switch.

In one or more embodiments disclosed herein, the first switch and second switch are transitioned to their respective states via the method illustrated in FIG. 2.2.

In step 206, the first switch is transitioned from the remediation state to the standby state after the status of the first switch has been remediated. In other words, while in the remediation state, any number of actions (an action set) may be performed. These actions may modify the operation of the first switch in a manner that places its status into a second predetermined status. The second predetermined status may be associated with a likelihood of the first switch being able to forward packets or otherwise not indicate that the first switch should be remediated.

Once the first switch has been remediated, the first switch may be transitioned to the standby state by preparing it to receive packets but not forward the packets. As noted above, the predetermined device set traffic manager may automatically adjust its operation (or be directed to change as part of the failover orchestrated by the switches) in response to the changes in state of the switches of the redundant switch. In this case, the predetermined device set traffic manager may change its operation to forward packets from the predetermined device set to first switch and the second switch (e.g., because neither switch is in a remediation state). Consequently, packets from the predetermined device set may be forwarded to both switches thereby allowing both switches to learn about the network environment in which they reside.

In step 208, packets associated with the predetermined device set are forwarded by the second switch. In other words, after performing the failover, packets that were previously being forwarded by the first switch may be forwarded by the second switch.

The method may end following step 208.

By performing a failover between switches of a redundant switch, as illustrated in FIG. 2.1, embodiments disclosed herein may enable packets to be exchanged with a predetermined device set during the failover. To further clarify aspects of the failover process, FIGS. 2.2-2.3 show methods that may be used to perform different portions of the failover process. Each of these methods are discussed below.

While not explicitly described throughout FIG. 2.1, each of the switches may maintain its own information regarding its operating state and status. For example, the switches may store data reflecting their respective states and statuses. The switches may update this information over time. Consequently, each switch may refer to this stored information in determining its own status. Each switch may also maintain information regarding the states and statuses of other switches.

FIG. 2.2 shows a flowchart describing a method for transitioning a switch from an active to standby state in accordance with one or more embodiments disclosed herein. The method may be performed by, for example, a switch (e.g., 134, 136, FIG. 1.2). Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in some manner.

In step 210, the second switch initiates forwarding of packets directed toward the predetermined device set to the first switch. To initiate the forwarding, the second switch may setup a tunnel to the first switch. The second switch may also update the programming of its packet processors to forward the packets directed toward the predetermined device set via the tunnel rather than to the predetermined device set traffic manager.

The second switch may also modify the packets so that the first switch will forward the packets directed from the second switch (e.g., via the tunnel) to the predetermined device set. For example, the second switch may decapsulate and encapsulate the packets to update the control information of the packets.

In step 212, upstream devices are modified to preferentially forward packet directed toward the predetermined device set to the second switch rather than the first switch. To do so, the second switch and/or the first switch may advertise metrics and/or other types of network information that cause the upstream devices to reprogram their packet processors to preferentially forward packets to the second switch rather than the first switch. For example, the switches may modify their advertised reachability information in a manner that indicates that the first switch may be a poorer choice than the second switch with respect to packets directed towards the predetermined device set.

The first switch and the second switch may cooperatively modify their respective reachabilities to modify the operation of the upstream devices. For example, the second switch may send a message or otherwise request that the first switch modify its reachability. Alternatively, another management entity (e.g., another device operably connected to the redundant switch) may orchestrate performance of this step and the other steps set forth in FIG. 2.2.

Due to the unsynchronized nature of the upstream devices, this process may take a period of time. The period of time may be determined heuristically. For example, the period of time may be based on the arrival of the first packet or on a determination that traffic is no longer flowing toward the first switch from the upstream devices, which may be accomplished by measuring counters implemented by the first switch that count the number of packets received from the first switch or by communicating with the first switch which may report the number of packets it has received to the second switch. The period of time may be determined via other methods without departing from embodiments disclosed herein.

At this point in the process, the upstream devices may direct some packets directed toward the predetermined device set to the first switch and other packets to the second switch. The predetermined device set traffic manager may transmit all packets from the predetermined device set to both of the switches, may transmit packets from the first switch to the predetermined device set, and may drop packets from the second switch. Additionally, the second switch may forward all received packets to the first switch.

In some embodiments disclosed herein, only one of the switches may advertise metrics and/or other types of network information that cause the upstream devices to reprogram their packet processors to preferentially forward packets to the second switch rather than the first switch. For example, the second switch may modify their advertised reachability information in a manner that indicates that the first switch may be a poorer choice than the second switch with respect to packets directed towards the predetermined device set.

In step 214, while the upstream devices are being modified (e.g., during the period of time), packets received by the second switch and directed toward the predetermined device set are forwarded to the first switch. This process may be automatic because, as discussed in step 210, the operation of the second switch was modified to cause this behavior.

For example, the packet processors of the second switch via their programmed rules may automatically forward these packets to the first switch. At this point in time, the predetermined device set traffic manager may be configured to only allow the first switch to transmit packets to the predetermined device set devices. Accordingly, as the packets directed to the predetermined device set are transitioned to the second switch by the upstream devices, the packets may be aggregated in only the first switch for forwarding to the predetermined device set via the predetermined device set traffic manager.

Additionally, as noted above, the second switch may utilize the same media access control address as the first switch when forwarding packets toward the predetermined device set. By doing so, the predetermined device set devices may view both switches as the same device.

In step 216, after the upstream devices are modified, the predetermined device set traffic manager is modified to transmit traffic from the second switch rather than the first switch. The predetermined device set traffic manager may be modified by programming the multiplexer of the predetermined device set traffic manager. Once programmed, the multiplexer may transmit packets from the second switch and drop packets from the first switch.

In step 218, after the upstream devices are modified, the second switch begins forwarding packets directed toward the predetermined device set to the predetermined device set traffic manager rather than the first switch. The second switch may do so by reprogramming its packet processors to do so. For example, the second switch may remove the tunnel route and corresponding rules in its packet processors. Consequently, the packet processors of the second switch may begin to forward the packets out of its port(s) operably connected to the predetermined device set traffic manager rather than those ports connected, directly or indirectly, to the first switch.

In step 220, after the upstream devices are modified, the second switch initiates forwarding of packets from the predetermined device set traffic manager and directed toward the upstream devices to the upstream devices. As discussed above, while in the standby state, the second switch may only observe packets from the predetermined device set rather than forward them. The second switch may do so by programming its packet processors to drop all packets from the predetermined device set.

To enter the active state, the second switch may begin forwarding packets from the predetermined device set. To do so, the second switch may reprogram its packet processors to no longer drop these packets. Consequently, the second switch may begin forwarding packets from the predetermined device set.

At this point in the process, the upstream devices may direct all packets directed toward the predetermined device set to the second switch and the predetermined device set traffic manager may direct all packets from the predetermined device set to only the second switch. Additionally, the second switch may forward all received packets directly towards their targets (i.e., rather than indirectly through the first switch).

The method may end following step 220.

Using the method illustrated in FIG. 2.2, packets may continue to be forwarded by the redundant switch while a switch failover is being performed.

FIG. 2.3 shows a flowchart describing a method for transitioning a switch from a remediation to standby state in accordance with one or more embodiments disclosed herein. The method may be performed by, for example, a switch (e.g., 134, 136, FIG. 1.2). Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in some manner.

In step 230, performance of an action set is initiated to remediate the first switch. The action set may include any number of actions including, for example, modifying a configuration of the first switch, updating software hosted by the first switch, adding new software to the first switch, and/or restarting the first switch. The action may include additional, different, and/or fewer actions without departing from embodiments disclosed herein. The actions of the action set may be based on a status of the first switch that caused the remediation to be performed. For example, each status may be associated with one or more actions stored in a remediation repository hosted by the first switch or another entity. The first switch may perform any number of these actions that are associated with the status of the first switch.

Performing the action set may modify an operating state of the first switch. Modifying the operating state of the first switch may modify its status (e.g., to one that does not indicate that the first switch should be remediated).

The first switch may do so under the direction of the second switch (e.g., the second switch may instruct or otherwise manage the processes). Alternatively, the first switch may do so under its own direction.

In step 232, after the first switch is remediated, a configuration of the first switch is updated to prevent the first switch from forwarding packets received from the predetermined device set traffic manager. For example, the packet processors of the first switch may be reprogrammed to drop packets from the predetermined device set. The first switch may do so under the direction of the second switch (e.g., the second switch may instruct or otherwise manage the process). Alternatively, the first switch may do so under its own direction.

At this point, the first switch may be in a standby mode of operation in which it is able to observe packets for learning purposes but not forward the packets on to other devices.

In step 234, after the configuration of the first switch is updated, the predetermined device set traffic manager is reconfigured to transmit packets from the predetermined device set to both the first switch and the second switch. As discussed above, the predetermined device set devices may view both switches as the same device (e.g., because both use the same virtual media access control address). The predetermined device set traffic manager may automatically send a copy of each packet to both switches but only the active switch takes action to forward the received copy of each packet.

The predetermined device set traffic manager may reconfigure itself in response to a message received from one of the switches.

The method may end following step 234.

Using the method illustrated in FIG. 2.3, a system in accordance with embodiments disclosed herein may remediate a switch while ensuring that packets from a predetermined device set continue to be forwarded during the remediation.

As discussed above, when a switch is remediated, it may, in part, be restarted. It may be restarted because it was operating in an undesirable manner. Consequently, prior to remediation, it may not be desirable to proactively attempt to reconfigure the switch so that, after restart, it begins to operate in a standby state. For example, due to the undesirable operating manner, the switch may not be able to be reconfigured. Consequently, once restarted, the switch may begin to operate in a manner consistent with its previous, active, operating state. Doing so might be disadvantageous because it may result in packets being duplicated or otherwise impact a network environment in an undesired manner. To avoid these potential complications, a switch in accordance with embodiments disclosed herein may perform the method illustrated in FIG. 2.4 upon restart and prior to providing packet forwarding services.

FIG. 2.4 shows a flowchart describing a method for operating a switch after it is restarted in accordance with one or more embodiments disclosed herein. The method may be performed by, for example, a switch (e.g., 134, 136, FIG. 1.2). Other entities may perform the method of FIG. 2.4 without departing from embodiments disclosed herein.

While the various steps in the flowchart shown in FIG. 2.4 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in some manner.

In step 240, the first switch determines whether it is in an active state. The first switch may make the determination by, for example, querying the states of other switches of the redundant switch, by querying a management entity, by reading information from a predetermined location indicate of its state, or via other methods. If the first switch is in an active state, then the method may end following step 240. Otherwise the method may proceed to step 242 following step 240.

In step 242, a configuration of the first switch is updated to prevent the first switch from forwarding packets received from a predetermined device set traffic manager. For example, the first switch may reprogram its packet processors to drop packets associated with a predetermined device set. At this point in time, the predetermined device set traffic manager may not be transmitting packets from the predetermined device set to the first switch.

In step 244, upstream devices are modified to preferentially forward traffic directed toward the predetermined device set to a second switch (that is the active switch) rather than the first switch. To do so, the first switch may advertise a reachability or other metric that is poorer than a similar metric advertised by the second switch. By doing so, the upstream devices may program their packet processors to forward packets directed toward the predetermined device set to the second switch rather than the first switch (i.e., to an active switch).

In step 246, network topology information is obtained. The network topology information may be obtained by, for example, querying another switch of the redundant switch (e.g., to update its network topology information to match that of the other switch), by issuing a network discovery request (e.g., ARP), or by performing other actions so that the first switch is able to obtain information with which it can use to program its packet processors to make appropriate decisions.

In one or more embodiments disclosed herein, the first switch sends a message to a second switch (i.e., the active switch). The message includes a request that the second switch perform network discovery techniques to obtain information regarding its network environment (e.g., to refresh its ARP and/or table entries). In response, the second switch may perform network discovery which causes other devices to send packets that include information regarding the network environment. Though not directed toward the first switch, the first switch may still receive them (by virtue duplicative sending of packets by the traffic managers) and learn about its network environment sufficiently to be able to program its packet processors in a manner consistent with the packet processors of the second switch.

The method may end following step 246.

Using the method illustrated in FIG. 2.4, a switch may operate in a manner following a restart that avoids generation of duplicative packets in the network environment in which the switch resides.

To further clarify embodiments disclosed herein, a non-limiting example is provided in FIGS. 3.1-3.5. FIGS. 3.1-3.5 may illustrate a system similar to that illustrated in FIG. 1.1. In FIGS. 3.1-3.5, actions performed by different components of the system are highlighted using sequentially number blocks starting at 1. For the sake of brevity, only a limited number of components of the system of FIG. 1.1 are illustrated in each of FIGS. 3.1-3.5.

Beginning of Example

Consider a scenario as illustrated in FIG. 3.1 in which file server (300) is providing data storage services to desktop computer (302). To provide the data storage services, file server (300) may send data to and receive data from desktop computer (302). Redundant switch (110) and upstream network (146) may facilitate the transmission of data by transmitting packets between file server (300) and desktop computer (302).

In FIG. 3.1, first switch (134) is in active mode and second switch (136) is in standby mode. Consequently, when desktop computer (302) sends data to file server (300), packets including the data are obtained by network side traffic manager (132). By virtue of first switch (134) being active, first switch (134) and second switch (136) previously advertised their reachability to upstream network (146) in a manner that causes upstream network (146) to preferentially route the packets through first switch (134).

Because first switch (134) is active, it forwards the packet toward file server (300) via predetermined device set traffic manager (138). In contrast, second switch (136) does not forward the packets and merely uses the packets for network topology learning purposes.

Similarly, when file server (300) sends packets towards desktop computer (302), predetermined device set traffic manager (138) sends copies of the packets to both switches (134, 136), but only first switch (134) forwards the packets to network side traffic manager (132). Second switch (136) drops the packets.

Over time, file server (300) and desktop computer (302) communicate with each other. During this time, second switch (136) monitors the status of first switch (134) by obtaining heartbeat information from first switch (134).

At a first point in time, at block 1, first switch (134) fails to provide heartbeat information to second switch (136). At block 2, second switch (136), by not receiving the heartbeat information, infers that the first switch (134) has an undesired status. Consequently, second switch (136) determines that a failover of first switch (134) is to be performed.

Turning to FIG. 3.2, at block 3, second switch (136) begins forwarding packets directed toward file server (300) to first switch (134). At block 4, second switch (136) modifies its reachability information that it advertises to upstream network (146) to be more desirable than that of first switch (134). Consequently, at block 5, upstream network (146) begins to converge in a manner that causes it to preferentially packet directed toward file server (300) toward second switch (136) rather than first switch (134). Accordingly, when desktop computer (302) sends packets toward file server (300), the packets traverse upstream network (146), are forwarded from upstream network (146) to second switch (136), are forwarded from second switch (136) to first switch (134), and are transmitted from first switch (134) to file server (300) via predetermined device set traffic manager (138).

Turning to FIG. 3.3., at block 6, second switch (136) sends a message to the predetermined device set traffic manager (138). The message requests that predetermined device set traffic manager (138) begin forwarding packets from second switch (136) to file server (300). In response, at block 7, predetermined device set traffic manager (138) reconfigures its multiplexer to forward packets from second switch (136) to file server (300) and to only forward packets from file server (300) to second switch (136) (rather than both switches).

At block 8, second switch (136) stops forwarding of packets directed toward file server (300) to first switch (134) and, at block 9, begins forwarding the packets to predetermined device set traffic manager (138). At this point, first switch (134) has transitioned to remediation mode and second switch (136) has transitioned to active mode.

Turning to FIG. 3.4, at block 10, second switch (136) sends a message to first switch (134). The message requests that first switch (134) restart. At block 11, first switch (134) receives the message and restarts itself.

After restarting, at block 12, first switch (134) modifies its configuration so that it will not forward packets received from predetermined device set traffic manager (138). Specifically, first switch reprograms its packet processors. At block 13, after reconfiguring itself, first switch (134) sends a message to predetermined device set traffic manager (138). In the message, first switch (134) requests that predetermined device set traffic manager (138) duplicate the packets from file server (300) to both first switch (134) and second switch (136).

At block 14, in response to the message, predetermined device set traffic manager (138) begins sending copies of packets from file server (300) to both first switch (134) and second switch (136).

End of Example

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide a redundant switch that is able to continue to forward packets during failovers. Specifically, the redundant switch may include at least two switches. One of the switches is active and performs packet forwarding while the others are in standby and do not perform packet forwarding. If the active switch needs to suspend packet forwarding, a failover process may be performed in which one of the standby switches takes over packet forwarding duties for the active switch. The failover process implemented by the redundant switch may limit packet drop and/or duplication during the failover. Consequently, devices operating within the network may see little to no impact on their operation due to the change in network topology.

Thus, embodiments disclosed herein may address the problem of service termination in a network environment. While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope of embodiments described herein should be limited only by the attached claims.

What is claimed is:

1. A redundant switch that provides communication services to a predetermined device set and upstream devices, comprising:
a physical network side traffic manager that facilitates communications between the redundant switch and the upstream devices;
a predetermined device set traffic manager that exclusively facilitates second communications between the redundant switch and the predetermined device set, wherein the predetermined device set comprises a first device, wherein the redundant switch is connected to the first device by a single physical connection over which the communication services are provided between the redundant switch and the first device, wherein packets transmitted from the first device to the redundant switch are only received via the single physical connection and are processed by the predetermined device set traffic manager prior to being processed by either a first physical switch or a second physical switch;
the first physical switch, interposed between the predetermined device set traffic manager and the physical network side traffic manager, that:
provides switching services between the network side traffic manager and the predetermined device set traffic manager,
indicates to the upstream devices that the first physical switch is an independent device, and
indicates to the predetermined device set that the first physical switch and the second physical switch are a same device; and
the second physical switch, interposed between the predetermined device set traffic manager and the network side traffic manager, that:
provides second switching services between the network side traffic manager and the predetermined device set traffic manager,
indicates to the upstream devices that the second physical switch is an independent device, and
indicates to the predetermined device set that the second physical switch and the first physical switch are the same device;
wherein the second physical switch is programmed to:
obtain information regarding a status of the first physical switch while the first physical switch is in an active state and the second physical switch is in a standby state;
make a determination that the status is undesired;
in response to the determination:
transition:
the first physical switch from the active state to a remediation state, and
the second physical switch from the standby state to the active state; and
transition the first physical switch from the remediation state to the standby state after the status of the first physical switch is remediated to a desired status.

2. The redundant switch of claim 1,
wherein, while in the active state, the first physical switch forwards first received packets from the predetermined device set, and
wherein, while in the standby state, the second physical switch receives but does not forward the first received packets from the predetermined device set.

3. The redundant switch of claim 2,
wherein, while in the active state, the first physical switch forwards second received packets from the upstream devices, and
wherein, while in the standby state, the second physical switch observes the second received packets from the upstream devices.

4. The redundant switch of claim 1, wherein transitioning the first physical switch from the active state to the remediation state and the second physical switch from the standby state to the active state comprises:

initiating forwarding of packets directed toward the predetermined device set to the first physical switch;
after initiating the forwarding, modifying the upstream devices to preferentially forward packets directed toward the predetermined device set to the second physical switch rather than the first physical switch;
after the upstream devices are modified:
modifying the predetermined device set traffic manager to forward packets from the predetermined device set to the second physical switch rather than the first physical switch; and
initiating forwarding of packets from the predetermined device set traffic manager and directed toward the upstream devices to the upstream devices.

5. The redundant switch of claim 1, wherein the predetermined device set traffic manager is disposed between the first physical switch and the predetermined device set, wherein the predetermined device set traffic manager is adapted to operate in accordance with at least three states:
while in a first state, forward packets destined to upstream devices to only the first physical switch;
while in a second state, forward the packets destined to upstream devices to only the second physical switch; and
while in a third state, forward the packets destined to upstream devices to both the first physical switch and the second physical switch.

6. The redundant switch of claim 1, wherein the network side traffic manager is disposed between the first physical switch and the upstream devices, wherein the network side traffic manager is adapted to forward all packets directed toward the predetermined device set to both the first physical switch and the second physical switch.

7. The redundant switch of claim 1, wherein transitioning the first physical switch from the remediation state to the standby state comprises:
initiating performance of an action set to remediate the first physical switch;
after the first physical switch is remediated, updating the first physical switch to prevent the first physical switch from forwarding any packets received from the predetermined device set traffic manager; and
after the first physical switch is updated, reconfiguring the predetermined device set traffic manager to forward all packets from the predetermined device set to the first physical switch and the second physical switch.

8. The redundant switch of claim 7, wherein updating the first physical switch comprises programming the first physical switch to drop all packets from the predetermined device set.

9. The redundant switch of claim 1, wherein the first physical switch and the second physical switch are both adapted to forward packets, destined for the predetermined device set, using a same virtual media access control address to indicate that the first physical switch and the second physical switch are the same device.

10. The redundant switch of claim 9, wherein the first physical switch indicates that it is an independent device by advertising as being different from the second physical switch to the upstream devices, wherein the second physical switch indicates that is an independent device by advertising as being different from the first physical switch to the upstream devices.

11. A method for providing communication services using a redundant switch to a predetermined device set and upstream devices, comprising:
indicating, by at least two physical switches interposed between a predetermined device set traffic manager and a physical network side traffic manager, the at least two physical switches executing within the redundant switch, wherein packets transmitted from the predetermined device set to the redundant switch are processed by the predetermined device set traffic manager prior to being processed by either of the at least two physical switches:
that the at least two physical switches are independent devices from a perspective of the upstream devices, and
that the at least two physical switches are a same device from a perspective of the predetermined device set;
obtaining information regarding a status of a first physical switch of the at least two physical switches while the first physical switch is in an active state and a second physical switch of the at least two physical switches is in a standby state,
wherein, while in the active state, the first physical switch provides packet forwarding services for the predetermined device set and,
wherein, while in the standby state, the second physical switch does not provide the packet forwarding services for the predetermined device set;
making a determination that the status is undesired;
in response to the determination:
transitioning:
the first physical switch from the active state to a remediation state, and
the second physical switch from the standby state to the active state; and
transitioning the first physical switch from the remediation state to the standby state after the status of the first switch is remediated to a desired status.

12. The method of claim 11, wherein transitioning the first physical switch from the active state to the remediation state and the second physical switch from the standby state to the active state comprises:
initiating, by the second physical switch, forwarding of packets directed toward the predetermined device set to the first physical switch;
after initiating the forwarding, modifying the upstream devices to preferentially forward packets directed toward the predetermined device set to the second physical switch rather than the first physical switch;
after the upstream devices are modified, modifying, by the second physical switch, the predetermined device set traffic manager to forward packets from the predetermined device set to the second physical switch rather than the first physical switch; and
initiating, by the second physical switch, forwarding of packets from the predetermined device set traffic manager and directed toward the upstream devices to the upstream devices.

13. The method of claim 11, wherein transitioning the first physical switch from the remediation state to the standby state comprises:
initiating performance of an action set to remediate the first physical switch;
after the first physical switch is remediated, updating the first physical switch to prevent the first physical switch from forwarding any packets received from the predetermined device set traffic manager; and
after the first physical switch is updated, reconfiguring the predetermined device set traffic manager to forward all packets from the predetermined device set to the first physical switch and the second physical switch.

14. The method of claim 13, wherein updating the first physical switch comprises programming the first physical switch to drop all packets from the predetermined device set.

15. The method of claim 11, wherein the first physical switch and the second physical switch are both adapted to forward packets, destined for the predetermined device set, using a same virtual media access control address to indicate that the at least two physical switches are the same device.

16. A non-transitory computer readable medium comprising computer readable program code, which when executed by a computer processor enables the computer processor to perform a method for providing communication services to a predetermined device set and upstream devices, the method comprising:
  indicating, by at least two physical switches interposed between a predetermined device set traffic manager and a physical network side traffic manager disposed within the redundant switch, wherein packets transmitted from the predetermined device set to the redundant switch are processed by the predetermined device set traffic manager prior to being processed by either of the at least two physical switches:
    that the at least two physical switches are independent devices to the upstream devices by having each of the at least two physical switches advertise separate distinguishable reachability information to the upstream devices, and
    that the at least two physical switches are a same device to the predetermined device set by having the at least two physical switches use a common virtual media access control address when forwarding packets to the predetermined device set;
  obtaining information regarding a status of a first switch of the at least two physical switches while the first switch is in an active state and a second switch, of the at least two physical switches and that provides packet switching redundancy for the first switch, is in a standby state;
  making a determination that the status matches a predetermined status;
  in response to the determination:
    transitioning:
      the first switch to the standby state, in part, by modifying the upstream devices to preferentially forward packets intended to be directed toward the predetermined device set through the first switch to the second switch rather than the first switch, and
      after transitioning the first switch to the standby state, the second switch to the active state.

17. The non-transitory computer readable medium of claim 16, wherein transitioning the first physical switch from the active state to the standby state and the second physical switch from the standby state to the active state comprises:
  prior to modifying the upstream devices, initiating, by the second physical switch, forwarding of packets directed toward the predetermined device set to the first physical switch;
  after the upstream devices are modified, modifying, by the second physical switch, the predetermined device set traffic manager to forward packets from the predetermined device set to the second physical switch rather than the first physical switch; and
  initiating, by the second physical switch, forwarding of packets from the predetermined device set traffic manager and directed toward the upstream devices to the upstream devices.

18. The non-transitory computer readable medium of claim 16, wherein transitioning the first physical switch to the standby state further comprises:
  initiating performance of an action set to remediate the first physical switch; after the first physical switch is remediated, updating the first physical switch to prevent the first physical switch from forwarding any packets received from the predetermined device set traffic manager;
  and after the first physical switch is updated, reconfiguring the predetermined device set traffic manager to forward all packets from the predetermined device set to the first physical switch and the second physical switch.

19. The non-transitory computer readable medium of claim 18, wherein updating the first physical switch comprises programming the first physical switch to drop all packets from the predetermined device set.

20. The non-transitory computer readable medium of claim 16, wherein the first physical switch and the second physical switch are both adapted to forward packets, destined for the predetermined device set, using a same virtual media access control address to indicate that the at least two physical switches are the same device.

* * * * *